United States Patent [19]

Barba et al.

[11] 3,997,408
[45] * Dec. 14, 1976

[54] THERMOCOMPRESSION-TYPE APPARATUS FOR DESALTING SALINE WATER

[75] Inventors: Diego Barba; Franco Concari; Giancarlo Spizzichino, all of Rome, Italy

[73] Assignee: Societa Italiana Resine S.I.R.S.p.A., Milan, Italy

[22] Filed: Mar. 19, 1975

[21] Appl. No.: 560,012

[30] Foreign Application Priority Data

Mar. 25, 1974 Italy .................................. 67938/74

[52] U.S. Cl. ................................. 202/236; 203/26; 203/4; 203/11; 159/13 A
[51] Int. Cl.² ....................... B01D 3/10; B01D 1/22
[58] Field of Search .......... 203/4, 26, 24; 202/236, 202/83; 159/13 A

[56] References Cited

UNITED STATES PATENTS

| | | | |
|---|---|---|---|
| 2,696,465 | 12/1954 | Kittredge | 203/24 |
| 3,245,460 | 4/1966 | Loebel | 203/4 |
| 3,356,125 | 12/1967 | Standiford, Jr. | 202/236 |
| 3,370,635 | 2/1968 | Kumm | 202/236 |

Primary Examiner—Norman Yudkoff
Assistant Examiner—J. Sofer
Attorney, Agent, or Firm—Sughrue, Rothwell, Mion, Zinn & Macpeak

[57] ABSTRACT

A thermocompression apparatus for desalting saline water, wherein: the evaporator tubes extend vertically above the separating chamber for steam and non-evaporated water and have their lower ends opening into the separating chamber through a lower header plate; the upper ends of the evaporator tubes extend through an upper header plate into a plenum chamber overlying the latter, said plenum chamber being arranged to provide a pool of saline water submerging the upper ends of the evaporator tubes; and each of said upper ends having means therein arranged to receive saline water from the pool and to discharge it in the form of falling film on the inner surface of its respective evaporator tube, whereby the said film and the steam produced therefrom flow co-currently downwardly in the tubes towards the separating chamber.

7 Claims, 6 Drawing Figures

# United States Patent [19]

Barba et al.

[11] 3,997,408
[45] * Dec. 14, 1976

[54] THERMOCOMPRESSION-TYPE APPARATUS FOR DESALTING SALINE WATER

[75] Inventors: Diego Barba; Franco Concari; Giancarlo Spizzichino, all of Rome, Italy

[73] Assignee: Societa Italiana Resine S.I.R.S.p.A., Milan, Italy

[22] Filed: Mar. 19, 1975

[21] Appl. No.: 560,012

[30] Foreign Application Priority Data

Mar. 25, 1974  Italy ................................ 67938/74

[52] U.S. Cl. ................................ 202/236; 203/26; 203/4; 203/11; 159/13 A
[51] Int. Cl.² ...................... B01D 3/10; B01D 1/22
[58] Field of Search ........... 203/4, 26, 24; 202/236, 202/83; 159/13 A

[56] References Cited

UNITED STATES PATENTS

| | | | |
|---|---|---|---|
| 2,696,465 | 12/1954 | Kittredge | 203/24 |
| 3,245,460 | 4/1966 | Loebel | 203/4 |
| 3,356,125 | 12/1967 | Standiford, Jr. | 202/236 |
| 3,370,635 | 2/1968 | Kumm | 202/236 |

Primary Examiner—Norman Yudkoff
Assistant Examiner—J. Sofer
Attorney, Agent, or Firm—Sughrue, Rothwell, Mion, Zinn & Macpeak

[57] ABSTRACT

A thermocompression apparatus for desalting saline water, wherein: the evaporator tubes extend vertically above the separating chamber for steam and non-evaporated water and have their lower ends opening into the separating chamber through a lower header plate; the upper ends of the evaporator tubes extend through an upper header plate into a plenum chamber overlying the latter, said plenum chamber being arranged to provide a pool of saline water submerging the upper ends of the evaporator tubes; and each of said upper ends having means therein arranged to receive saline water from the pool and to discharge it in the form of falling film on the inner surface of its respective evaporator tube, whereby the said film and the steam produced therefrom flow co-currently downwardly in the tubes towards the separating chamber.

7 Claims, 6 Drawing Figures

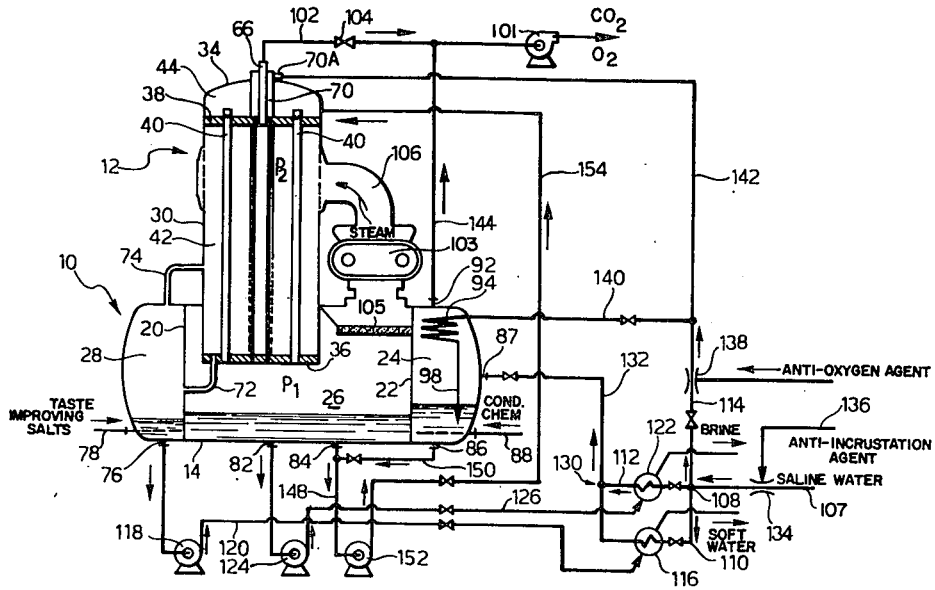

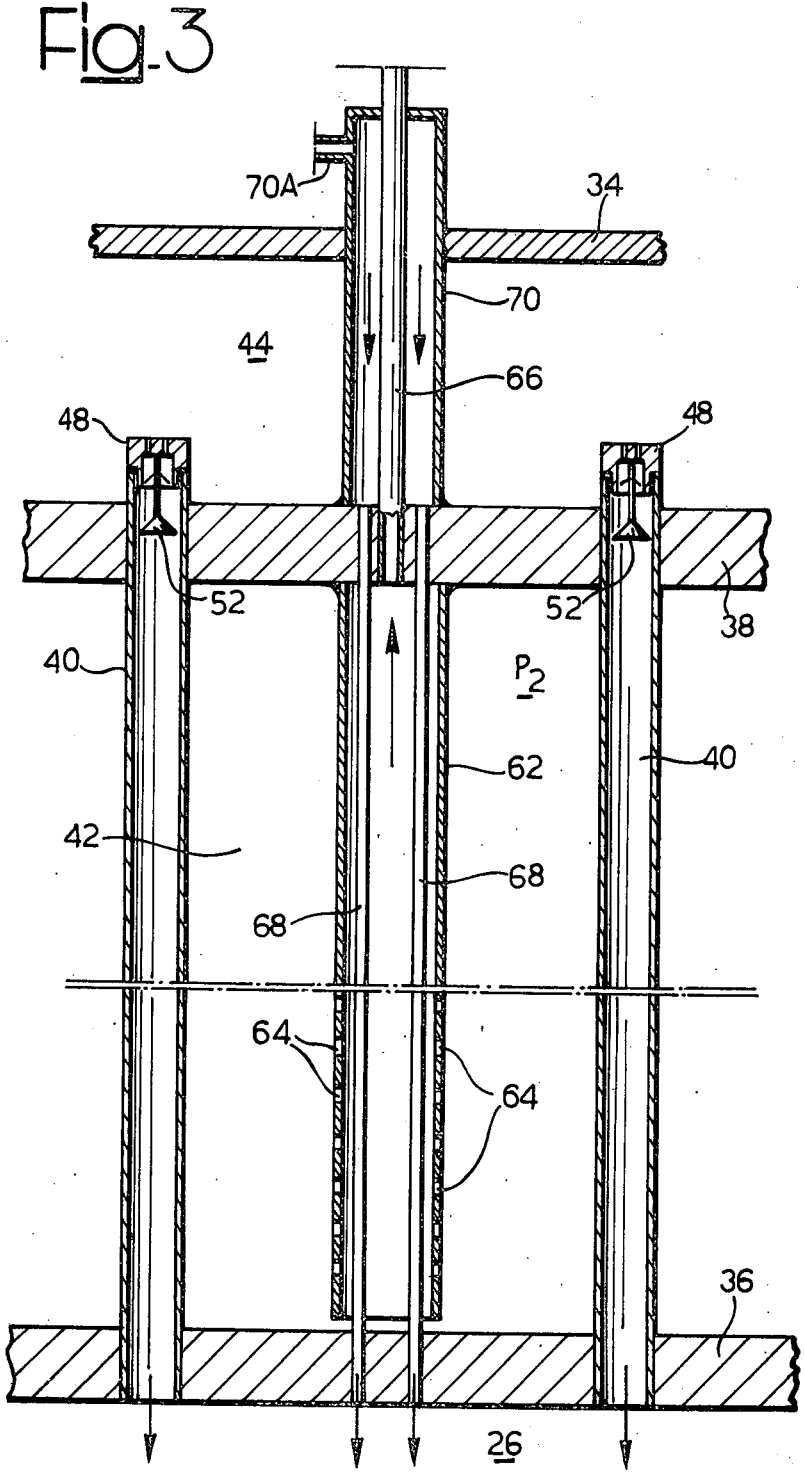

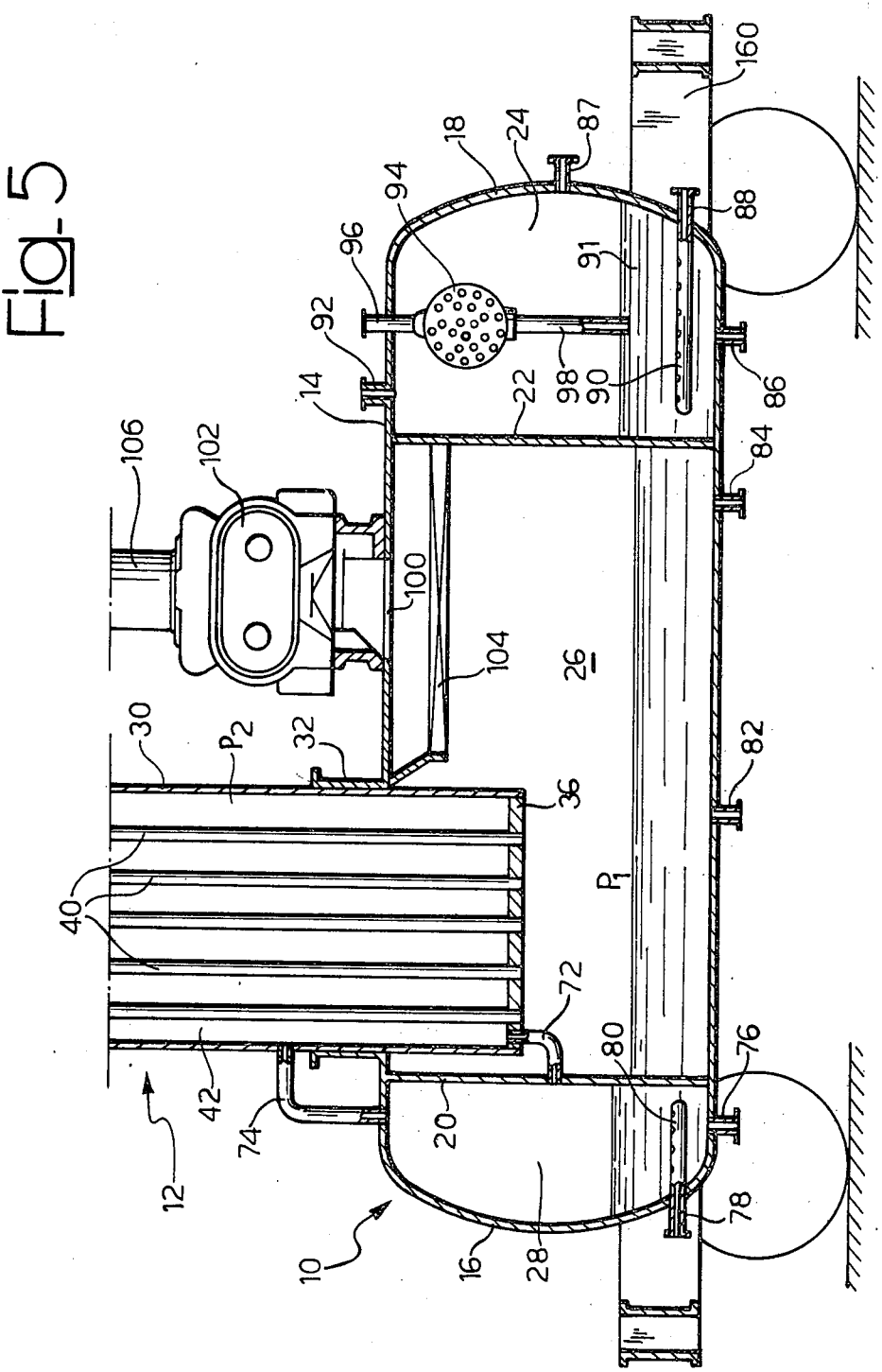

THERMOCOMPRESSION-TYPE APPARATUS FOR DESALTING SALINE WATER

This invention relates to the art of desalting saline water, such as sea water, by evaporation.

More particularly, the invention relates to a desalting apparatus operating on the principle of thermocompressione, otherwise known as steam-compression. In such apparatus, the saline water is caused to flow on a heat-exchange surface; the temperature of the steam produced in this manner is increased by means of a compressor and the compressed steam is used to heat the said heat-exchange surface by yielding to the latter its condensation heat. The condensate is recovered and provides the desired product, that is soft water. Obviously, the purity of the produced soft water depends upon the efficiently with which the produced steam is separated from its entrained microscopic droplets of the saline water. This separation is known as "demisting". The overall efficiency of the apparatus mainly depends upon the efficiency of the heat-exchange section. In known thermocompression desalters the heat transfer from the steam to the saline water is seriously impaired by incrustations necessitating a periodical removal at frequent intervals. Disincrustation is relatively easy as long as smooth heat-exchange tubes are used in the evaporator. However, smooth heat-exchange tubes, as compared with longitudinally ribbed ("fluted") tubes, exhibit a relatively small area to the passage of heat, so that a very large number of tubes must be used in the evaporator. Further drawbacks of known thermocompression desalters will be pointed out hereinafter, with reference to the drawings.

An object of this invention is to provide a thermocompression desalter of an extremely high efficiency. It is also an object of the invention to provide a desalter of an extraordinarily compact structure which may easily be transported and quickly installed to operate at any desired location. A specific object of this invention is to provide a thermocompression desalter in which fluted tubes may be utilized in the evaporator without a substantial risk of incrustations. Further objects and advantages will be evident to those skilled in the art from the following description.

To achieve the above objects the invention provides a thermocompression desalting apparatus for saline water comprising: an evaporator section including a heating chamber and a bundle of evaporator tubes crossing the chamber; means for circulating saline water through the tubes of the bundle, the said means including a separating chamber in which the steam produced in the evaporator section is separated from the non-evaporated saline water; a compressor arranged to such steam from the separating chamber and to deliver it at an increased pressure to the heating chamber as heating fluid for the evaporator tubes; and means for recovering the condensate from the heating chamber; the said apparatus being characterized in that: the evaporator tubes extend vertically above the separating chamber and have their lower ends opening into the latter through a lower header plate; the upper ends of the evaporator tubes extend through an upper header plate into a plenum chamber overlying the latter, said plenum chamber being included in said means for circulating saline water and being arranged to provide a pool of said water submerging said upper ends of the evaporator tubes; and each of said upper ends having means therein arranged to receive saline water from the pool and to discharge it in the form of a falling film on the inner surface of its respective evaporator tube. Preferably, the evaporator tubes are fluted tubes.

According to an advantageous embodiment, the apparatus moreover comprises a suction tube in the heating chamber depending from the upper header plate into the lower half of the height of the heating chamber, means connecting the upper end of the suction tube to a vacuum source, and a steam condenser in the suction tube. Also, advantageously, the suction tube depends from the upper header plate to the proximity of the lower header plate and is foraminuous through a length comprised within the said lower half of the height of the heating chamber. In this manner the suction tube sucks from the heating chamber a multitude a gaseous streams comprising a relatively wet, heavy steam atmosphere, and the streams impinge upon each other in the tube whereby coalescence of the microscopic water droplets in the streams is substantially promoted.

In the accompanying drawings:

FIG. 2 is a schematic view of an apparatus according to the invention;

FIG. 3 is an axial cross-sectional view of a part of the apparatus shown in FIG. 2;

FIG. 5 is a vertical cross-sectional view of the base part of the apparatus.

Figure 1:
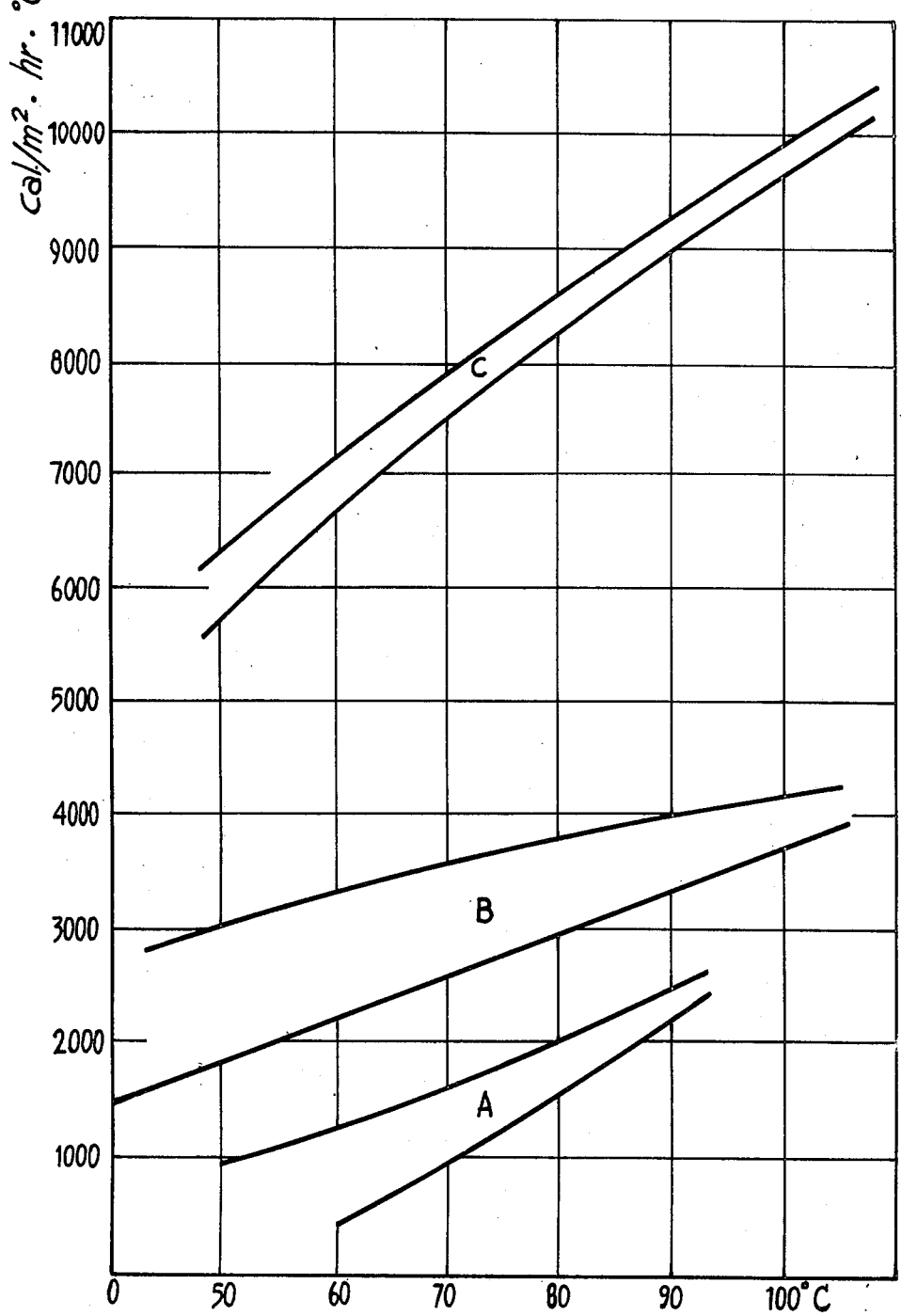
FIG. 1 is a diagram exemplifying the values of the heat-transfer coefficient (expressed in Cal. per $m^2 \cdot hr.^\circ C$) as a function of the evaporation temperature of sea water in a thermocompression-type desalter.
Figure 4:
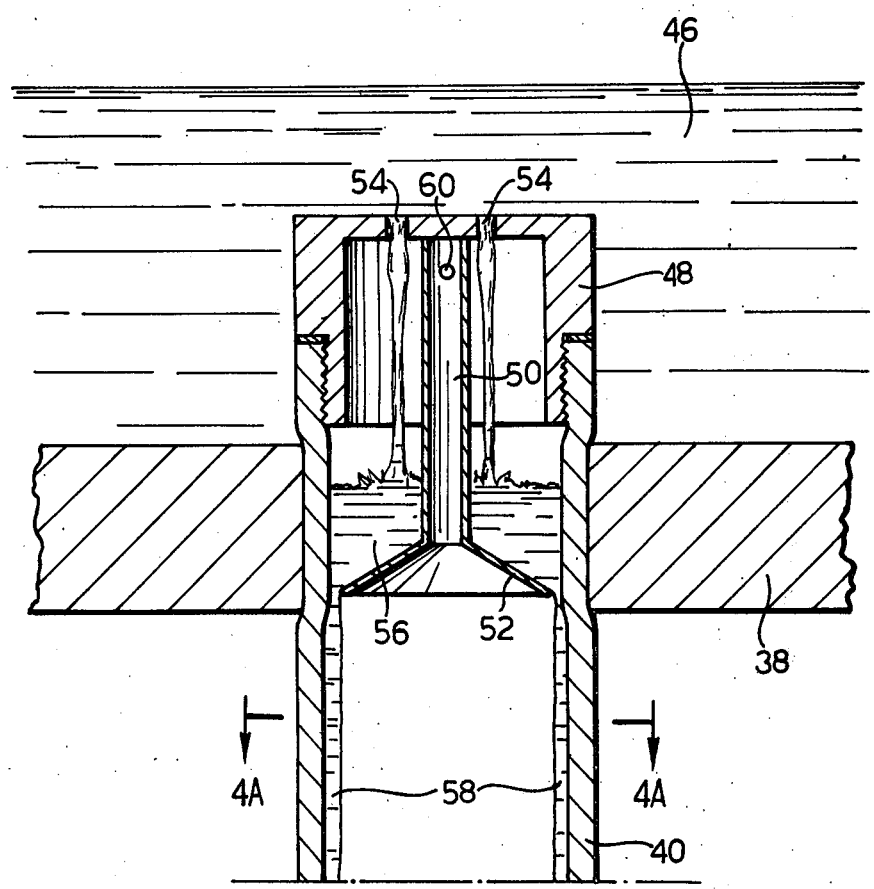
FIG. 4 is an enlarged axial cross-sectional view of the upper end zone of one of the falling film tubes of the apparatus.
Figure 4A:
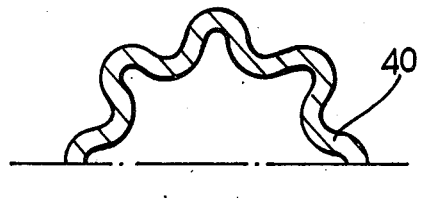
FIG. 4A is a part cross-sectional view of line 4A—4A of FIG. 4.

The natural tendency of the steam evolving in an evaporation zone is to move upwardly. Thus, thermocompression desalters have been developed in the art comprising a bundle of vertically extending evaporator tubes and means producing a rising film of saline water in each of the tubes, the evolving steam being discharged at the upper end of the bundle. These conditions correspond to the zone marked A in FIG. 1 and it will be seen that, under these conditions, the heat transfer coefficient is very poor, so that an extremely great number of evaporator tubes must be used to obtain a commercially acceptable hourly production of soft water. The so-called fluted tubes (having an uncomparably greater heat-transmission surface) cannot be used in these rising film evaporators, primarily because of difficulties connected with the obtention of a rising film in fluted tubes.

Thermocompression desalters are also known operating on the principle of the falling film. To this end, the evaporator comprises a bundle of horizontally extending tubes, through which thermocompressed steam is circulated. The falling film is produced on the outer surfaces of the horizontal tubes in the bundle, whereby the evolving steam is free to move upwardly in accordance with its natural tendency. The heat-transfer coefficient is initially relatively favourable (zone B in FIG. 1); however, incrustations relatively rapidly form on the outer surfaces of the tubes thereby lowering the efficiency. Fluted tubes cannot be used because, as opposed to smooth circular tubes, their periodic disincrustation is much more tedious if not impossible at all.

The present invention is based on the falling film principle. The falling film is produced on the inner surface of evaporator tubes vertically extending through a heating chamber and the steam evolving in the tubes is caused to flow downwardly, i.e. co-currently with the film owing to suction exerted by the compressor; the thermocompressed steam is contacted in the heating chamber with the outer surfaces of the evaporator tubes and condenses thereon, the pressure constantly being subatmospheric both within and outside the tubes. Under these conditions the evaporator tubes are practically permanently free of incrustations and, therefore, fluted tubes may advantageously be used without prejudice. The heat-transfer coefficient is constantly very high (see zone C in FIG. 1), especially when provision is made for evacuating incondensables from a specific location in the system, namely from a lower part of the heating chamber.

Referring now to FIGS. 2–5, the apparatus comprises a base section 10 and an evaporator section 12. The base section essentially comprises a horizontal cylindrical closed-ended vessel 14 with domed end walls 16, 18 and a pair of internal impervious vertical partitions 20, 22 subdividing the inside of the vessel into a conditioning chamber 24 at one end of the vessel, a separation chamber 26 as the centre of the vessel and a collecting chamber 28 at the other end of the vessel. The separation chamber 24 extends through a major part of the length of the vessel.

The vessel 14 can be made of sheet steel plated with a copper alloy, or of stainless steel, or else of fiber-reinforced polyester resin.

The evaporator section 12 comprises a cylindrical, vertical sheet-metal casing 30 of steel sealingly seated in an upwardly directed mouth 32 formed in the vessel 14, whereby a bottom part of the casing 30 protrudes downwardly into the separation chamber 26. The upper end wall 34 of the casing 30 is domed, while the lower end of the casing 30 is sealingly closed by a header plate 36 and a similar header plate 38 is provided in the upper end region of said body. The header plates are preferably made of "naval brass". A plurality of fluted, vertical evaporator tubes 40 extend between and through the header plates 36, 38 and freely open at their lower ends into the separation chamber 26. The tubes 40 are preferably made of a non-ferrous alloy; copper-nickel alloys and aluminum brass are preferred. The part 42 of the casing 30 which surrounds the tubes 40 provides a heating chamber serviced by the steam produced in the apparatus, while the part 44 overlying the upper header plate 38 provides a plenum chamber in which a pool 46 (FIG. 4) of saline water is constantly maintained for feeding the evaporator tubes. Each of the evaporator tubes 40 (FIG. 4) protrudes upwardly from the header plate 38 and has a cap 48 which is sealingly screwed into the tube and is submerged by the pool 46. The cap 48 has a depending tubular stem located on the axis of the tube 40 and a frusto-conical roof member 52 is rigidly fitted to the lower end of the stem. A uniform annular clearance of 0.5 – 2 mm is provided between the circumference of the member 52 and the inner surface of the tube 40, and the member 40 is located at a height between the upper and lower face of the header plate 38, that is in the region at which the tube 40 is circular (non fluted) in cross-section by being expanded in its circular hole in the plate 38 by means of an expanding mandrel. A circular series of calibrated passages 54 is formed in the cap 48 around the stem 50, whereby saline water outflows from the pool 46 into the tube 40 at a uniform rate, such that a secondary pool 56 of water is formed above the roof member 52 from which the water is distributed in the form of a falling film 58 on the inner surface of the tube 40. An vent aperture 60 is advantageously formed in the upper end region of the tubular stem 50 for the purpose of balancing the pressure above the secondary pool 56 with the pressure prevailing below the roof member 52.

The tubes 40 are preferably of a nominal diameter from about 50 mm to about 100 mm.

The tubes 40 are uniformly arranged in a bundle leaving free a central space extending along the axis of the casing 30. The said space is necessary to accommodate means for evacuating incondensables. Referring to FIG. 3, the said means comprise an axial suction tube 62, of a diameter of, say, 15–20 cm, having its upper end sealingly welded to the lower face of the header plate 38 and opening freely at its lower end in the proximity to the lower header plate 36. A multitude of suction apertures 64 is formed in the wall of the tube 62 in the region which is adjacent the lower end of the tube and may extend to approximately mid-height of the heating chamber 42. Suction is produced in the tube 62 by an axial tube 66 extending upwardly from the header plate 38 to the outside through the upper end wall 34 of the casing 30, the lower end of the tube 66 being sealingly fitted into the plate 38 and opening freely into the upper end of the tube 62.

The suction tube 62 houses a steam condenser arranged to condense steam from the gaseous flow being sucked through the tube. In the embodiment shown, the condenser comprises a circular series of vertical condenser tubes 68 having their opposite ends sealingly extending through the header plates 36, 38. The lower ends of the condenser tubes 68 freely open into the separation chamber 26. The upper ends of the tubes 68 open into a vertical manifold tube 70, extending axially upwardly from the header plate 38 and sealingly crossing the upper end wall 34 in coaxial relation with the tube 66, the lower end of the manifold tube 70 being sealingly welded to the header plate 38. The diameter of the condenser tubes typically is 20–25 mm. In operation, cool saline water is supplied to the manifold tube 70 through a fitting 70A at the upper and of the latter and is discharged through the condenser tubes 68 into the separating chamber 26, while any steam sucked through the suction tube 62 condenses on the condenser tubes 62, similarly to the steam in chamber 42 condensing on the evaporator tubes 40. The condensate collects on the upper face of the header plate 36, and it will be seen in FIG. 5 that a downcomer tube 72 is fitted into and through the plate 36 and opens through the partition 20 into the collecting chamber 28 in which the soft water produced by the apparatus collects. The upper end of the downcomer tube 72 is advantageously flush with the upper face of the header plate 36, whereby the depth of the layer of condensate on the said plate is reduced to a minimum. A bypass tube 74 connects the atmosphere in the collecting chamber 28 with the atmosphere in the heating chamber 42 for pressure balancing purposes. Soft water is recovered from the collecting chamber 28 through a fitting 76 in the bottom of the chamber. The latter is equipped with a further fitting 78 and a foraminous plunging tube 80 for introducing into the collected soft water metered amounts of a concentrated solution of salts, if desired, to make the water really "drinkable".

Two discharge fittings 82, 84 are provided in the bottom of the separation chamber 26, and a similar discharge fitting 86 is provided in the bottom of the conditioning chamber 24 (FIG. 5). The latter is provided with a further fitting 87 for supplying to the chamber preheated saline water, and a still further fitting 88 and a foraminous plunging tube 90 for optionally introducing into the saline water 91 in the chamber conditioning substances, mainly anti-incrustation agents and anti-oxygen agents (e.g. sodium sulphite or hydrazine). Gases, such as carbon hydroxide, evolving from saline water 91 in the conditioning chamber 24 are removed through a fitting 92 in an upper part of the chamber. The gas removal is accomplished by suction, and the latter produces incipient evaporation of water 91. To prevent, or minimize loss of water vapour a condenser 94 is placed in the atmosphere of the chamber 24 and is fed with a flow of cool saline water through a fitting 96; the flow is thus preheated and is discharged into the chamber 24 through a dipping tube 98, while at the same time the vapour condensed on the condenser 94 drips into the pool of saline water 91 in the chamber.

A wide aperture 100 (FIG. 5) is formed in the top wall portion of the separating chamber 26, and a compressor 103 is sealingly mounted on said wall portion above the chamber 26 to suck the steam from said chamber through said aperture. The latter is screened by a demister 105, e.g. of a fibrous mat, arranged to separate droplets of water, if any, from the stream of steam sucked by the compressor. The compressor preferably is of centrifugal or rotary type, e.g. Roots-type. A large tubular elbow 106 connects the delivery side of the compressor with an upper portion of the heating chamber 42 (FIG. 2). Thus, the steam issuing from the lower ends of the evaporator tubes 40 is taken up by the compressor and delivered at increased pressure to the heating chamber wherein it condenses on the evaporator tubes 40 in accordance with the thermocompression principle. The condensation heat is absorbed by the falling film of saline water in the tubes 40 and the steam thus generated in the tubes flows downwardly co-currently with the liquid film and separates in the separation chamber 26 while the concentrated saline water (brine) collects at the bottom of the chamber. The descending flow of liquid in the tubes 40 keeps the inner surfaces of the tubes clean of deposits and incrustations. The film of condensate (soft water) on the outer surfaces of the tubes 40 flows downwardly and collects on the lower header plate 36 from which the liquid is quickly evacuated through the downcomer tube 72 thereby to prevent formation on the plate 36 of a pool of liquid which may undesirably reduce the effective length of tubes 40 (i.e. the length freely exposed to the thermocompressed steam in the heating chamber 42).

In operation, the pressure in the tubes 40 and chamber 26 is kept at a subatmospheric value $P_1$ such that the falling film of saline water in the tubes 40 boils at 45°–90° C, preferably 60°–75° C. At the same time, a subatmospheric pressure $P_2$ is established in the condensation chamber 42 through the tube 66 which is connected to a vacuum pump 101 (FIG. 2) through a conduit 102 having a regulating valve 104 interposed therein. The ratio $P_2:P_1$ advantageously is from 1.1 : 1 to 1.5 : 1, preferably from 1.15 : 1 to 1.30 : 1. It will be readily realized that said pressure ratio is the "thermocompression ratio" applied to the steam by the compressor 103. In other words, the steam at pressure $P_1$ in the separation chamber 26 is compressed to a pressure of 1.15 to 1.30 times $P_1$ and condenses at this increased pressure on the tubes 40. At the temperatures indicated hereinbefore, the pressure $P_1$ is from about 0.1 kg/cm² to about 0.7 kg/cm², preferably from about 0.2 kg/cm² to about 0.4 kg/cm².

Referring to FIG. 2, crude saline water is continuously supplied to the desalting apparatus through a conduit 107, which branches at point 108 into three conduits 110, 112 and 114. A heat exchanger 116 is interposed in the conduit 110, to which relatively warm soft water from chamber 28 is supplied through the fitting 76, a pump 118 and a conduit 120, whereby the stream of crude saline water in branch conduit 110 is preheated. Similarily, a heat exchanger 122 is interposed in the branch conduit 112, to which relatively warm brine from separation chamber 26 is supplied through the fitting 82, a pump 124 and a conduit 126 thereby to preheat the stream of crude saline water in branch conduit 112. The conduits 110, 112 meet each other at 130 and the two preheated streams are supplied to the conditioning chamber 24 through a single conduit 132 and fitting 87. To avoid incrustations in the exchangers 116, 122 the feed conduit 106 has preferably interposed therein an injector 134 throgh which an anti-incrustation agent may be supplied from a conduit 136.

The stream in branch conduit 14 serves for cooling purposed and, therefore, is not preheated. More particularly, an injector 138 is interposed in the conduit 114 through which an anti-oxygen agent is added to the stream. Past the injector 138 the conduit 114 branches into two conduits 140, 142. Conduit 140 discharges into the conditioning chamber 24 through the tubes of the condenser 94 and the dipping tube 98. Since th preheated crude saline water fed to the chamber 24 through the conduit 132 undergoes decompression on reaching the chamber, gaseous substances such as carbon dioxide, oxygen and some steam flash off from the liquid feed while the temperature drops by about 1°–2° C, due to decompression. The incondensables (carbon dioxide, oxygen) are removed through the fitting 92 by means of a conduit 144 opening into the conduit 102 at a location between the valve 104 and vacuum pump 101, while access of steam to the vacuum pump is minimized by the condenser 94. For the latter purpose the condenser 94 is arranged in the conditioning chamber 24 in the top region of the latter, that is in the region from which the atmosphere in the chamber is sucked by the fitting 92, whereby the steam concentration in the sucked gases is drastically reduced and the sucked gases essentially consist of incondensables.

The conduit 142 delivers cool saline water to the fitting 70A and tube 70, from which the cool water flows downwardly through the condenser tubes 68 (FIG. 3) and is discharged therefrom into the separation chamber 26. The condenser tubes 68 act as a sort of reflux condenser or dephlegmator operating in counter-current flow with respect to the steam and incondensables sucked through the suction tube 64; the steam is thus condensed and, practically, only the incondensables pass to the vacuum pump 101. It was found that the suction tube 64 and condenser tubes 68 substantially improve the performance of the apparatus described hereinbefore.

The fittings 84 and 86 are connected by conduits 148, 150 to a common pump 152, the delivery side of which is connected by a conduit 154 to the plenum chamber 44. In operation, the intake flow in the pump consists in part only of the preheated saline water conditioned in chamber 24 and in part of the hot brine collected in the separating chamber 26, whereby the temperature of the liquid delivered through the conduit 154 to the plenum chamber 44 is relatively close to the boiling temperature of the liquid at the pressure $P_1$ prevailing in the evaporator tubes 40. More particularly, the apparatus operates by causing the brine in chamber 26 to continuously circulate in an evaporation circuit comprising the said chamber, pump 152, conduit 154, plenum chamber 44 and evaporator tubes 40, while a make-up flow of conditioned water from chamber 24 is continuously added to the circuit to compensate for the condense discharged into the collecting chamber 28 and for the flow of brine continuously tapped from the chamber 26 through the fitting 82. The flows in the various conduits are adjusted by the regulating valves shown in FIG. 2.

The apparatus described above is extremely compact. Actually, its body 10, 12 may be mounted on a wheeled carriage 160 (FIG. 5) together with the pumps, heat-exchangers and related conduits, and may be powered by a Diesel-engine unit conveniently arranged on a supplemental carriage.

We claim:
1. In a thermocompression desalting apparatus for saline water comprising: an evaporator section including a heating chamber and a bundle of evaporator tubes crossing the chamber; means for circulating saline water through the tubes in the bundle, the said means including a separating chamber in which the steam produced in the evaporator section is separated from the non-evaporated saline water; a compressor arranged to suck steam from the separating chamber and to deliver it at an increased pressure to the heating chamber as heating fluid for the evaporator tubes; and means for recovering the condensate from the heating chamber; the improvement comprising: the said evaporator tubes extending vertically above the separating chamber and having their lower ends opening into the latter through a lower header plate; the upper ends of the evaporator tubes extending through an upper header plate into a plenum chamber overlying the latter, said plenum chamber being included in said circulating means and being arranged to provide a pool of said water submerging the upper ends of the evaporator tubes; each of said upper ends having means therein arranged to receive saline water from the said pool and to discharge it in the form of a falling film on the inner surface of its respective evaporator tube, a suction tube in the heating chamber depending from the upper header plate into the lower half of the height of the heating chamber, means connecting the upper end of the suction tube to a vacuum source, and a steam condenser in the suction tube.

2. In the apparatus of claim 1, the said steam condenser comprising a bundle of condenser tubes extending between and through the two header plates, the said condenser tubes having their lower ends opening into the separating chamber, the upper ends of the condenser tubes opening into a manifold tube extending from the upper header plate through the plenum chamber to the outwards of the evaporator section, and means provided to supply to the manifold tube a cool saline water as refrigerant for the condenser tubes.

3. In the apparatus of claim 1, the said suction tube depending from the upper header plate to the proximity of the lower header plate and being foraminous through a length comprised within the said lower half only of the height of the heating chamber.

4. In the apparatus of claim 1, the said suction tube arranged on the axis of the bundle of evaporator tubes.

5. In a thermocompression desalting apparatus for saline water comprising: an evaporator section including a heating chamber and a bundle of evaporator tubes crossing the chamber; means for circulating saline water through the tubes in the bundle, the said means including a separating chamber in which the steam produced in the evaporator section is separated from the non-evaporated saline water; a compressor arranged to suck steam from the separating chamber and to deliver it at an increased pressure to the heating chamber as heating fluid for the evaporator tubes; and means for recovering the condensate from the heating chamber; the improvement comprising: the said evaporator tubes extending vertically above the separating chamber and having their lower ends opening into the latter through a lower header plate; the upper ends of the evaporator tubes extending through an upper header plate into a plenum chamber overlying the latter, said plenum chamber being included in said circulating means and being arranged to provide a pool of said water submerging the upper ends of the evaporator tubes; each of said upper ends having means therein arranged to receive saline water from the said pool and to discharge it in the form of a falling film on the inner surface of its respective evaporator tube, the said evaporator section comprising a vertical cylindrical casing which encloses the plenum chamber and the heating chamber and is closed at its lower end by said lower header plate; a base section supporting the evaporator section comprising a horizontal cylindrical closed-ended vessel having a pair of inner impervious vertical partitions therein; the said partitions defining in the vessel a collecting chamber at one end of the vessel, a conditioning chamber at the opposite end of the vessel, and the said separating chamber extending between the partitions through a major part of the length of the vessel; an upwardly directed mouth in a top zone of the wall of the vessel in the region of the separating chamber; the casing of the evaporator section sealingly seated in the said mouth and having its bottom part protruding through the said mouth into the separating chamber; a downcomer tube opening at its upper end through the lower header plate into the heating chamber and at its lower end into the collecting chamber through the respective partition thereby to discharge into the collecting chamber the condensate from the upper face of the lower header plate; the said compressor being mounted on a top wall portion of the said vessel above the separating chamber and having its intake communicating with the latter chamber through an aperture in the said top wall portion; a tubular elbow connecting the delivery side of the compressor to an upper portion of the heating chamber; a conduit supplying saline water to be desalted opening into the conditioning chamber; a further conduit connecting a top portion of the conditioning chamber to the said vacuum source; and pump means connecting the bottom region of both the separating chamber and conditioning chamber to the plenum chamber to thereby deliver to the latter the saline water to be evaporated in the evaporator tubes.

6. In the apparatus of claim 5, a condenser in the said top portion of the conditioning chamber, and conduit means provided to supply to the latter condenser a stream of cool saline water and to discharge said stream into the conditioning chamber.

7. The apparatus of claim 5, supporting on a wheeled carriage.

* * * * *